(12) United States Patent
Kontani

(10) Patent No.: US 9,296,445 B2
(45) Date of Patent: Mar. 29, 2016

(54) FRAME STRUCTURE FOR SADDLE-TYPE VEHICLE

(71) Applicant: HONDA MOTOR CO., LTD., Tokyo (JP)

(72) Inventor: Masahiro Kontani, Wako (JP)

(73) Assignee: HONDA MOTRO CO., LTD., Tokyo (JP)

( * ) Notice: Subject to any disclaimer, the term of this patent is extended or adjusted under 35 U.S.C. 154(b) by 0 days.

(21) Appl. No.: 14/659,331

(22) Filed: Mar. 16, 2015

(65) Prior Publication Data

US 2015/0274239 A1   Oct. 1, 2015

(30) Foreign Application Priority Data

Mar. 26, 2014   (JP) ................................. 2014-064452

(51) Int. Cl.

| | | |
|---|---|---|
| *B62K 11/04* | (2006.01) | |
| *F02M 35/04* | (2006.01) | |
| *F02M 35/024* | (2006.01) | |
| *B60K 13/02* | (2006.01) | |
| *B60K 13/06* | (2006.01) | |
| *F02M 35/16* | (2006.01) | |
| *F02M 35/06* | (2006.01) | |

(52) U.S. Cl.
CPC ................ *B62K 11/04* (2013.01); *B60K 13/02* (2013.01); *B60K 13/06* (2013.01); *F02M 35/02416* (2013.01); *F02M 35/048* (2013.01); *F02M 35/06* (2013.01); *F02M 35/162* (2013.01)

(58) Field of Classification Search
CPC .. B62K 11/04; B62K 13/02; F02M 35/02416; F02M 35/048

USPC .......................................................... 180/219
See application file for complete search history.

(56) References Cited

U.S. PATENT DOCUMENTS

| | | | | |
|---|---|---|---|---|
| 5,577,570 | A * | 11/1996 | Shiohara et al. ............... | 180/219 |
| 6,251,151 | B1 * | 6/2001 | Kobayashi et al. ............. | 55/309 |
| 7,264,072 | B2 * | 9/2007 | Yoshikawa et al. .......... | 180/68.3 |
| 7,357,205 | B2 * | 4/2008 | Nishizawa .................... | 180/68.3 |
| 7,380,624 | B2 * | 6/2008 | Momosaki .................... | 180/68.3 |
| 7,748,746 | B2 * | 7/2010 | Beiber Hoeve et al. ...... | 280/835 |
| 7,779,950 | B2 * | 8/2010 | Hoeve et al. .................. | 180/219 |
| 7,963,358 | B2 * | 6/2011 | Buell et al. ..................... | 180/225 |
| 8,146,693 | B2 * | 4/2012 | Oohashi et al. .............. | 180/68.3 |
| 8,181,729 | B2 * | 5/2012 | Hiramatsu et al. ........... | 180/68.3 |
| 2004/0060545 | A1 * | 4/2004 | Kurayoshi et al. ............ | 123/472 |
| 2009/0008181 | A1 * | 1/2009 | Pedersen et al. .............. | 180/229 |
| 2009/0090090 | A1 * | 4/2009 | Nishizawa et al. ............. | 55/290 |

FOREIGN PATENT DOCUMENTS

JP            2512878 Y2    10/1996

* cited by examiner

*Primary Examiner* — Kevin Hurley
*Assistant Examiner* — Michael Stabley
(74) *Attorney, Agent, or Firm* — Birch, Stewart, Kolasch & Birch, LLP

(57) ABSTRACT

A hollow main frame extends rearwardly from a head pipe. An air cleaner includes a filter element disposed in the main frame forming a dirty side and a clean side. The main frame includes a front opening for introducing intake air. The main frame includes an inner wall surface having a first rib extending peripherally and projecting inwardly into the space in the main frame. A second rib is disposed upstream or downstream of the first rib with respect to an intake air flow and projects inwardly into the space in the main frame. The filter element has an engaging member extending substantially along the inner wall surface and engageable with the second rib. The first rib peripherally surrounds the filter element to provide a division wall with the second rib engaging the filter element to support the filter element.

17 Claims, 9 Drawing Sheets

FRAME STRUCTURE FOR SADDLE-TYPE VEHICLE

CROSS-REFERENCE TO RELATED APPLICATIONS

The present application claims priority under 35 USC 119 to Japanese Patent Application No. 2014-064452 filed Mar. 26, 2014 the entire contents of which are hereby incorporated by reference.

BACKGROUND OF THE INVENTION

1. Field of the Invention

The present invention relates to a frame structure, and more particularly to a frame structure for a saddle-type vehicle having a monocoque structure wherein an air cleaner is contained in a main frame.

2. Description of Background Art

Some conventional saddle-type vehicles have a main frame with a monocoque structure that contains an air cleaner in a hollow interior thereof. The main frame of the monocoque structure is arranged such that air which has passed through the main frame and has been purified by the air cleaner is supplied to an engine mounted in a lower portion of the main frame through an intake passageway connected to the main frame. See, for example, Japanese Utility Model Registration No. 2512878.

The structure disclosed in Japanese Utility Model Registration No. 2512878 employs fastener members such as bolts for fixing the filter element of the air cleaner. Since the structure that employs bolts requires a tool for installing and removing the filter element, a working space is required for inserting the tool. In addition, the air cleaner needs periodic maintenance. Thus, a certain working time is necessary to fasten and unfasten the filter element with fastener members such as bolts.

SUMMARY AND OBJECTS OF THE INVENTION

The present invention has been made in view of the above problems. It is an object of an embodiment of the present invention to provide a frame structure for a saddle-type vehicle having a monocoque structure wherein a filter element can easily be installed in and removed from a frame.

According to an embodiment of the present invention, a frame structure for a saddle-type vehicle, includes a hollow main frame extending rearwardly from a head pipe. An air cleaner includes a filter element disposed in the main frame, and divided into a dirty side and a clean side by the filter element. The main frame includes a front opening defined in a front portion thereof for introducing intake air. The main frame includes an inner wall surface having a first rib extending peripherally and projecting into a space in the main frame, and a second rib disposed upstream or downstream of the first rib with respect to an intake air flow and projecting inwardly into the space in the main frame. The filter element has an engaging member extending substantially along the inner wall surface and engageable with the second rib. In addition, the first rib peripherally surrounds the filter element to provide a division wall with the second rib engaging the filter element to support the filter element.

According to an embodiment of the present invention, a third rib projects inwardly into the space in the main frame and is disposed between the first rib and the second rib in overlapping relation to the filter element as viewed along the direction of the intake air flow.

According to an embodiment of the present invention, the filter element has a flange in a position overlapping the third rib as viewed along the direction of the intake air flow, the flange having a round end surface on a distal end thereof.

According to an embodiment of the present invention, the main frame has an upper opening defined in an upper portion thereof. The upper opening is closed by an upper lid. The upper lid has a fourth rib disposed on an inner surface thereof and projecting in overlapping relation to the filter element as viewed along the direction of the intake air flow.

According to an embodiment of the present invention, as viewed in a sectional side elevation of the main frame, the second rib is disposed downstream of the first rib with respect to the intake air flow and is located within a vertically projected range of the upper opening.

According to an embodiment of the present invention, the main frame has a water drain hole defined therein upstream of the filter element with respect to the intake air flow and positioned downwardly of at least an element filter.

According to an embodiment of the present invention, as viewed in a sectional side elevation of the main frame, a lower rib wall section of the first rib and a lower wall surface of the inner wall surface which is slanted downwardly toward a projection proximal portion of the lower rib wall section jointly define therebetween a downwardly recessed space disposed upstream of the lower rib wall section with respect to the intake air flow.

According to an embodiment of the present invention, the main frame is composed of an integral structural component produced by casting.

According to an embodiment of the present invention, the inner wall surface of the main frame has the first rib extending peripherally and projecting inwardly into the space in the main frame, and the second rib disposed upstream or downstream of the first rib with respect to an intake air flow and projecting inwardly into the space in the main frame. The filter element has the engaging member extending substantially along the inner wall surface and engageable with the second rib with the first rib peripherally surrounding the filter element to provide the division wall. The second rib engages the filter element to support the filter element. Therefore, there is no need for fastener members such as bolts or the like for holding the filter element in position. The filter element can thus be installed and removed with ease, resulting in an increase in the serviceability of the air cleaner.

According to an embodiment of the present invention, the third rib projecting inwardly into the space in the main frame is disposed between the first rib and the second rib in an overlapping relation to the filter element as viewed along the direction of the intake air flow. The filter element can also be supported by the third rib.

According to an embodiment of the present invention, the filter element has the flange in the position overlapping the third rib as viewed along the direction of the intake air flow, the flange having the round end surface on the distal end thereof. For installing or removing the filter element, the round end surface of the filter element is provisionally held in an overlapping relation to the third rib, and the filter element is turned about the round end surface until it is installed or removed. The filter element is easily positioned when it is installed, and is better handled, e.g., is prevented from falling off when it is removed.

According to an embodiment of the present invention, the main frame has the upper opening defined in the upper portion thereof, the upper opening is closed by the upper lid, and the upper lid has the fourth rib disposed on the inner surface thereof and projecting in overlapping relation to the filter element as viewed along the direction of the intake air flow. A portion of the filter element can be positionally limited and pressed by the fourth rib.

According to an embodiment of the present invention, as viewed in the sectional side elevation of the main frame, the second rib is disposed downstream of the first rib with respect to the intake air flow and is located within the vertically projected range of the upper opening. Since the upper opening can be used as a working space, the filter element can be installed and removed easily and efficiently.

According to an embodiment of the present invention, the main frame has the water drain hole defined therein upstream of the filter element with respect to the intake air flow and positioned downwardly of at least an element filter. Therefore, the element filter is prevented from becoming wet with water.

According to an embodiment of the present invention, as viewed in a sectional side elevation of the main frame, the lower rib wall section of the first rib and the lower wall surface of the inner wall surface jointly define therebetween the downwardly recessed space disposed upstream of the lower rib wall section of the first rib with respect to the intake air flow. Dust in the dirty side can be held in the downwardly recessed space. Therefore, the main frame can easily be cleaned when the filter element is installed and removed.

According to an embodiment of the present invention, the main frame is composed of the integral structural component produced by casting. Therefore, the first rib, the second rib, and the third rib that project inwardly into the space in the main frame are produced in a single casting process. Thus, the main frame can be produced highly efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
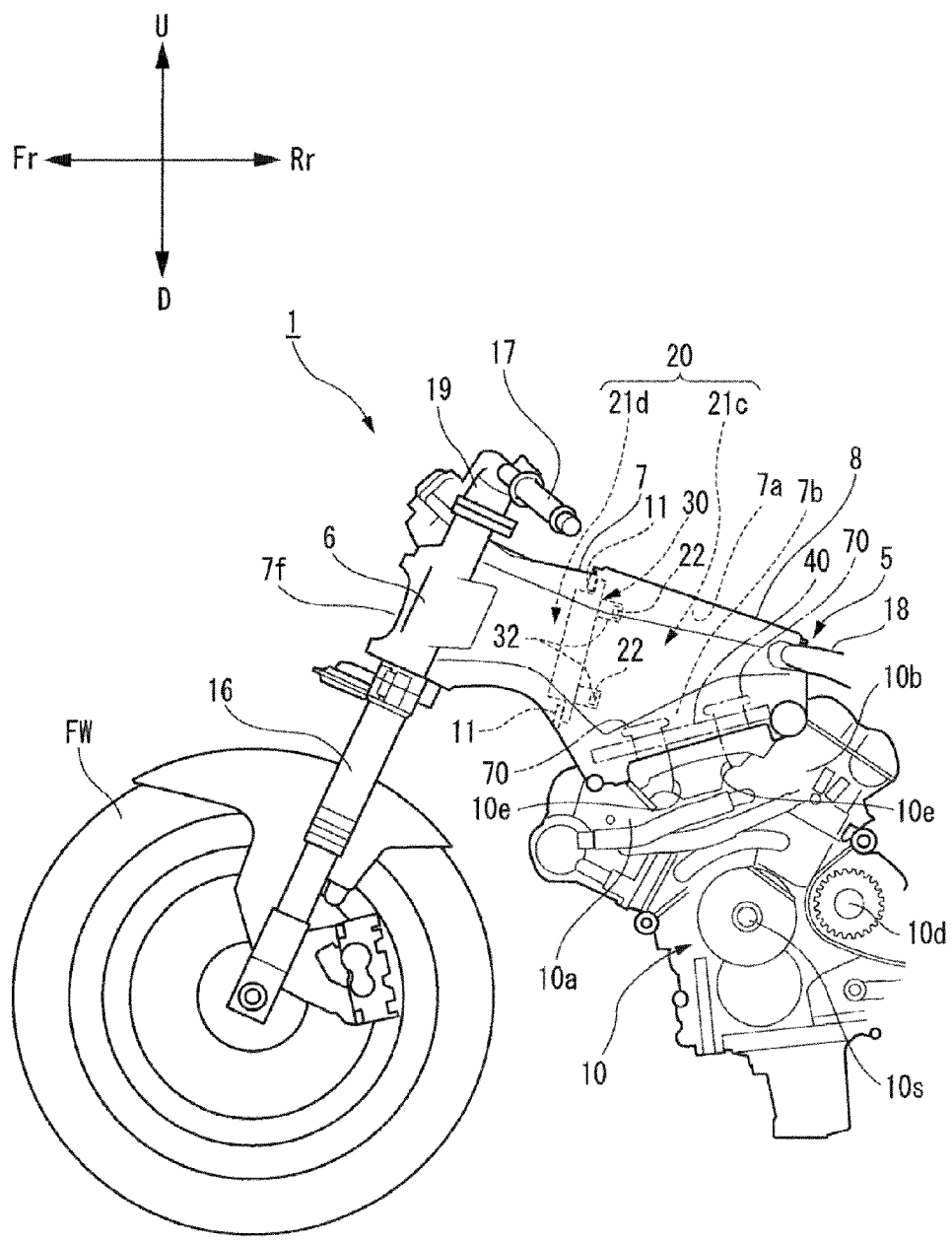
FIG. 1 is a fragmentary left side elevational view of a saddle-type vehicle having a main frame of a frame structure according to the present invention.

A motorcycle as a saddle-type vehicle according to an embodiment of the present invention will be described below with reference to FIGS. 1 through 9. The drawings shall be viewed in accordance with the direction of reference characters. In the description that follows, the terms "front," "rear," "left," "right," "upper," "lower," and similar directional words are used in accordance with the directions as viewed from the rider of the motorcycle. In the drawings, forward, rearward, leftward, rightward, upward, and downward directions of the vehicle are indicated by Fr, Rr, L, R, U, and D, respectively.

As shown in FIG. 1, a frame structure 5 which serves as a framework of the body of a motorcycle 1 has a hollow main frame 7 extending rearwardly from a head pipe 6 and a rear frame 18 extending rearwardly from a rear portion of the main frame 7. A seat, not shown, for the rider of the motorcycle 1 to sit astride thereon is supported on the rear frame 18. A suspension steering mechanism for a front wheel FW includes a front fork 16 steerably connected to the head pipe 6 and a bar handle 17 mounted on the upper end of a steering shaft 19 that extends through the head pipe 6 from an upper portion of the front fork 16. An engine 10 for driving a rear wheel, not shown, is held in a position beneath the main frame 7.

The engine 10 is a V-shaped engine having a plurality of cylinders 10a and 10b which include two left and right juxtaposed cylinders in each of front and rear banks, for example, that are arranged in a V shape forwardly and rearwardly of a crankshaft 10s.

The rear wheel, not shown, is supported on a swing arm, not shown, vertically swingably supported pivotally on a rear end of the engine 10 below the rear frame 18. To the rear wheel, there is transmitted drive power from the engine 10 through a drive chain, not shown, that is trained around a drive sprocket 10d on the engine 10 and a driven sprocket, not shown, on the rear wheel.

Figure 2:
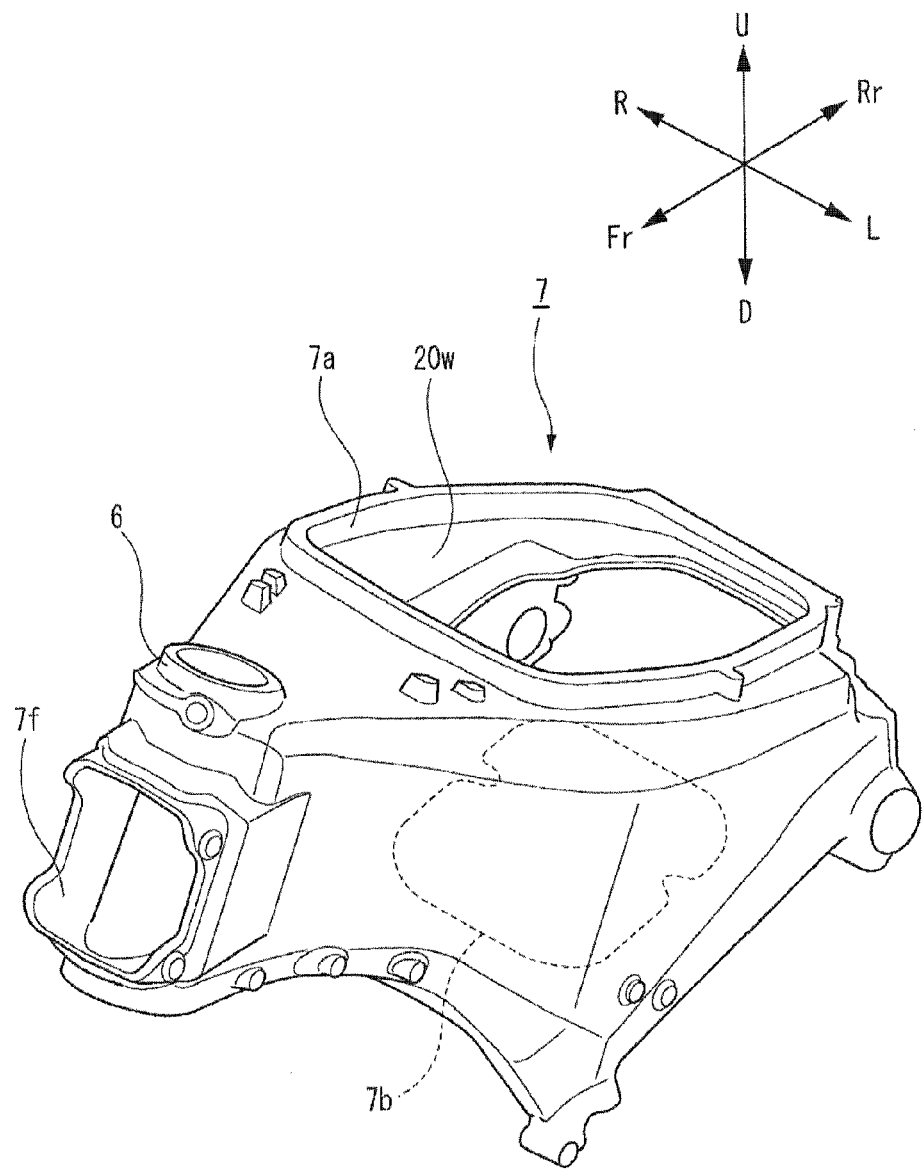
FIG. 2 is a perspective view of the main frame, as viewed from an obliquely upper left point of view, incorporated in the saddle-type vehicle shown in FIG. 1.
Figure 3:
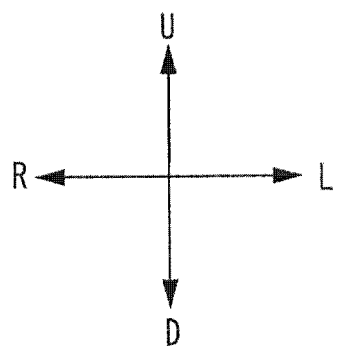
FIG. 3 is a front elevational view of the main frame shown in FIG. 2.
Figure 3:
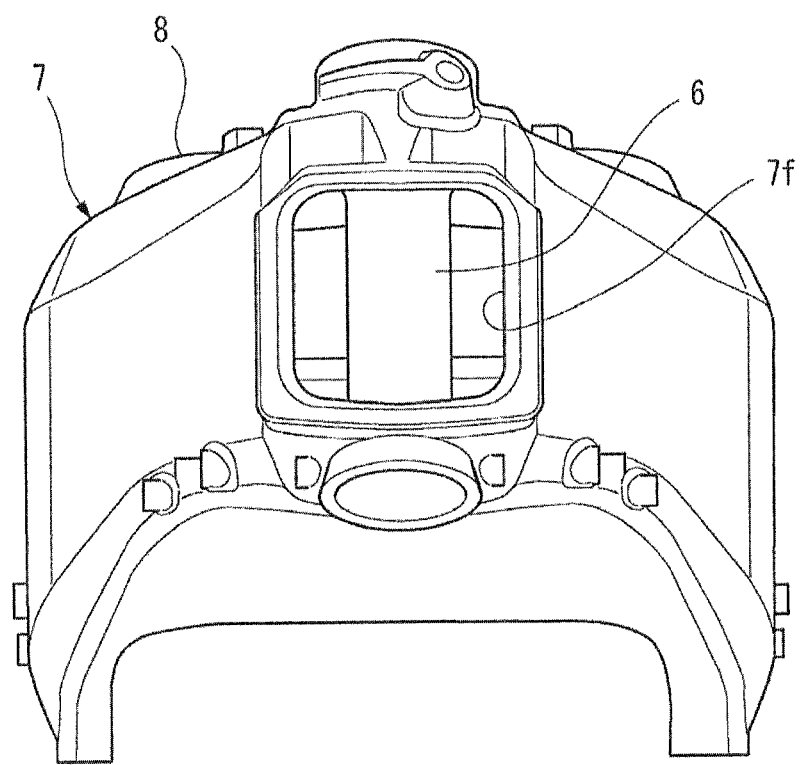

As shown in FIGS. 1, 2, and 3, the main frame 7 is of a monocoque structure with a large inner space defined therein. The main frame 7 has a front opening 7f defined in a front portion thereof for introducing intake air, and a joint opening 7b defined in a lower portion thereof for connection to the engine 10. The main frame 7 also has an upper opening 7a defined in an upper portion thereof and closed by an upper lid 8.

A filter element 30 is mounted in the main frame 7. The filter element 30 mounted in the main frame 7 makes up an air cleaner 20 that includes a dirty side 21d positioned forwardly of the filter element 30 and a clean side 21c positioned rearwardly of the filter element 30.

The engine 10 that is disposed beneath the main frame 7 and the clean side 21c of the air cleaner 20 are connected to each other by a plurality of intake passage members 70 that are held by a joint opening lid 40 closing the joint opening 7b. The intake passage members 70 are connected to throttle bodies 10e.

Figure 5:
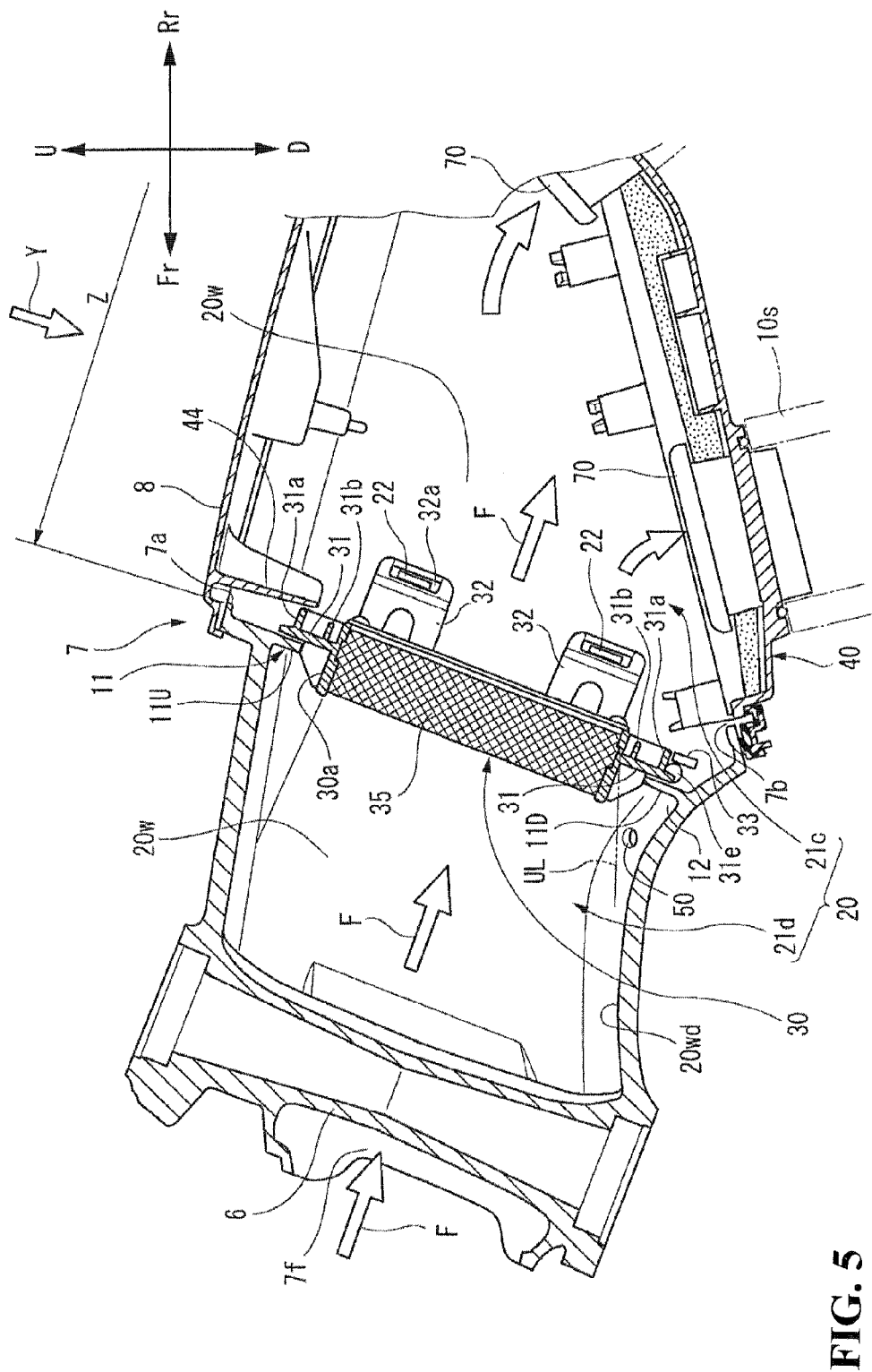
FIG. 5 is a fragmentary cross-sectional view, taken along a longitudinal plane, of the main frame with a filter element mounted therein.

The air cleaner 20 thus constructed operates as follows. In FIG. 5, an intake air flow F flows in from the front and enters the dirty side 21d through the opening 7f passes through the filter element 30 into the clean side 21c. Then, the intake air flow F is supplied to the throttle bodies 10e from the intake passage members 70 that are open into the clean side 21c.

Figure 4:
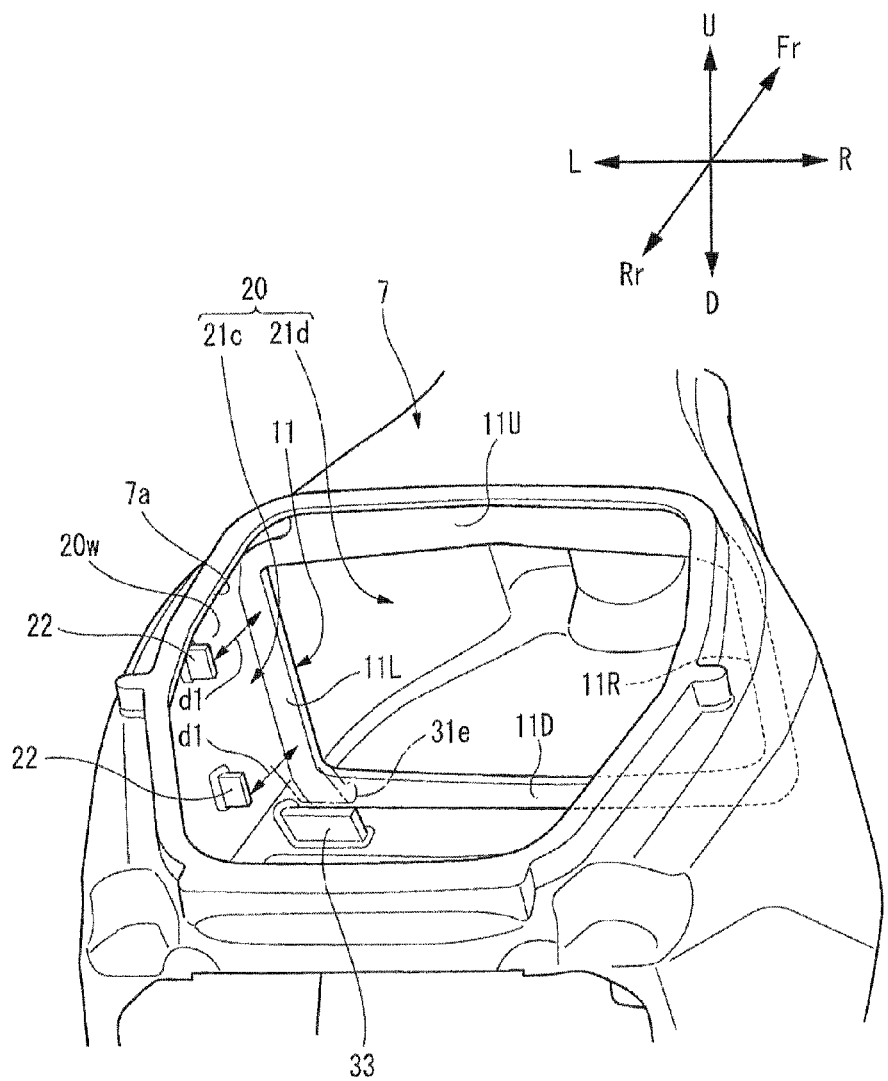
FIG. 4 is a perspective view of the main frame, as viewed from an upper rear point of view, shown in FIG. 2, the view showing an interior of the main frame.

As shown in FIG. 4, the filter element 30 is disposed in a longitudinally substantially middle position in the main frame 7. According to the present embodiment, the filter element 30 is installed in position by a rib structure on an inner wall surface 20w of the air cleaner 20 and a frame structure on the filter element 30, as described below, without using bolts which are needed by conventional filter elements.

The rib structure on the inner wall surface 20w of the main frame 7 will be described below.

As shown in FIG. 4, a first rib 11 is disposed on the inner wall surface 20w at a position that is seen forwardly through the upper opening 7a. The first rib 11 extends continuously fully peripherally on upper, lower, left, and right sections of the inner wall surface 20w and projects inwardly into the space in the main frame 7 along a transverse cross-sectional plane across the motorcycle. The first rib 11 is composed of an upper rib wall section 11U, a lower rib wall section 11D, a left rib wall section 11L, and a right rib wall section 11R.

Two pairs of left and right second ribs 22 (see FIG. 7 for right second ribs 22) that project inwardly into the space in the main frame 7 are disposed on the inner wall surface 20w rearwardly of the first rib 11, i.e., downstream of the first rib 11 with respect to the intake air flow F. The second ribs 22, each in the form of a plate, are spaced equal distances d1 from the left rib wall section 11L and the right rib wall section 11R and are juxtaposed vertically.

Figure 6:
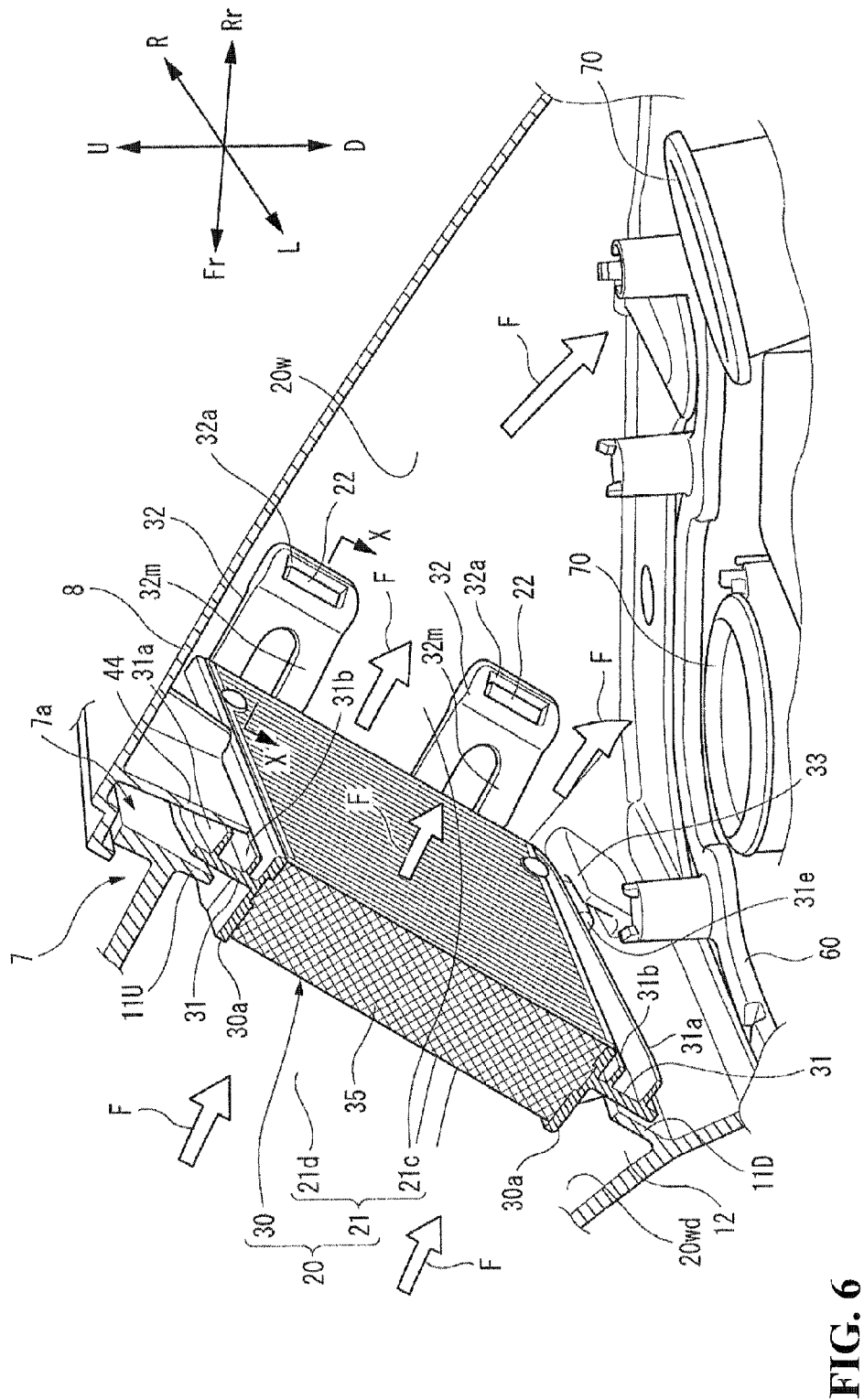
FIG. 6 is a fragmentary sectional perspective view of an interior of the main frame with the filter element mounted therein, as viewed from a clean side.
Figure 7:
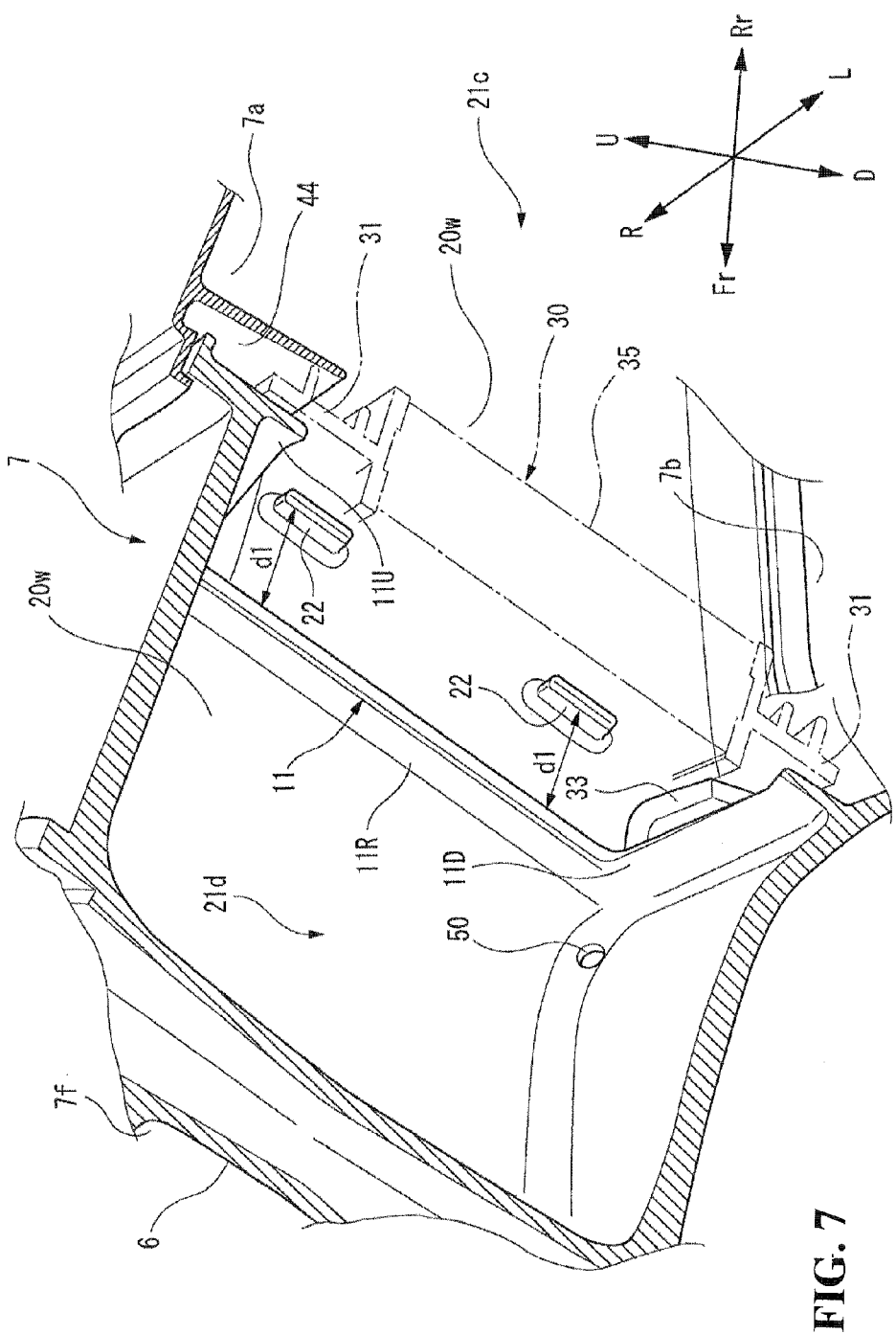
FIG. 7 is a fragmentary sectional perspective view of an interior of the main frame with the filter element not mounted therein, as viewed from a dirty side.

According to the present embodiment, as shown in FIGS. 4, 5, and 6, a pair of left and right third ribs 33 that project inwardly into the space in the main frame 7 in overlapping relation to a lower flange 31 of the filter element 30 as viewed along the direction of the intake air flow F are disposed between the first rib 11 and the second ribs 22. The third ribs 33 project parallel to and adjacent to the lower rib wall section 11D of the first rib 11.

As viewed in a sectional side elevation of the main frame 7 shown in FIG. 5, the first rib 11 is disposed upstream of the upper opening 7a with respect to the intake air flow F, whereas the second ribs 22 are disposed downstream of the first rib 11 with respect to the intake air flow F and are located in positions within a projected range Z of the upper opening 7a as viewed substantially from above the main frame 7, i.e., along the direction indicated by the arrow Y in FIG. 5. This structure allows the filter element 30 to be easily inserted through the upper opening 7a and installed in position in the main frame 7.

The main frame 7 has a water drain hole 50 defined in the lower portion thereof forwardly of the filter element 30. For example, the water drain hole 50 is positioned downwardly of the lower end UL (see FIG. 5) of an element filter 35.

As seen in the sectional side elevation of the main frame 7, a lower rib wall section 11D of the first rib 11 and a lower wall surface 20wd of the inner wall surface 20w which is slanted downwardly toward the projection proximal portion of the lower rib wall section 11D jointly define therebetween a downwardly recessed space 12 disposed forwardly of the lower rib wall section 11D, i.e., upstream of the lower rib wall section 11D with respect to the intake air flow F.

The main frame 7 is produced as an integral structural component by casting. Therefore, a number of protrusions, such as the first rib 11, the second ribs 22, and the third ribs 33 that project inwardly into the space of the main frame 7 are produced in a single casting process.

The main frame 7 has the rib structure described above which is disposed therein. As shown in FIGS. 5 and 6, the filter element 30 includes an outer peripheral frame 30a surrounding the outer periphery of the element filter 35 of the filter element 30. Flanges 31 project outwardly from the outer peripheral frame 30a. Each of the flanges 31 includes two reinforcing ribs 31a and 31b extending in a thicknesswise direction of the filter element 30, for example. The flanges 31 which are positioned respectively on the left and right sides of the filter element 30 have two pairs of left and right engaging members 32 (only the right engaging arms 32 are shown) extending substantially rearwardly along the inner wall surface 20w. The engaging members 32 have engaging holes 32a defined in the distal end portions of respective engaging arms 32m which extend rearwardly. The second ribs 22 can engage in the respective engaging holes 32a.

As shown in FIGS. 5 and 6, the filter element 30 is held in engagement between the first rib 11 and the second ribs 22 by the flanges 31 of the filter element 30 which are kept in contact with a rear surface 11g of the first rib 11 and by the second ribs 22 which are fitted in the respective engaging holes 32a of the engaging members 32.

According to the present embodiment, the filter element 30 may have the engaging members 32 urging the flanges 31 to abut against the rear surface 11g of the first rib 11, for example. The engaging members 32 may produce urging forces by making the distance d2 from hole front wall surfaces 32aw of the engaging holes 32a to front wall surfaces 31f of the flanges 31 slightly greater than the spacings d1 between the first rib 11 and the second ribs 22, and also by making themselves of synthetic resin. In other words, since the engaging arms 32m of the engaging members 32 are slightly flexed when the second ribs 22 engage in the respective engaging holes 32a, the filter element 30 can be supported so as to be pressed against the first rib 11.

Figure 8:
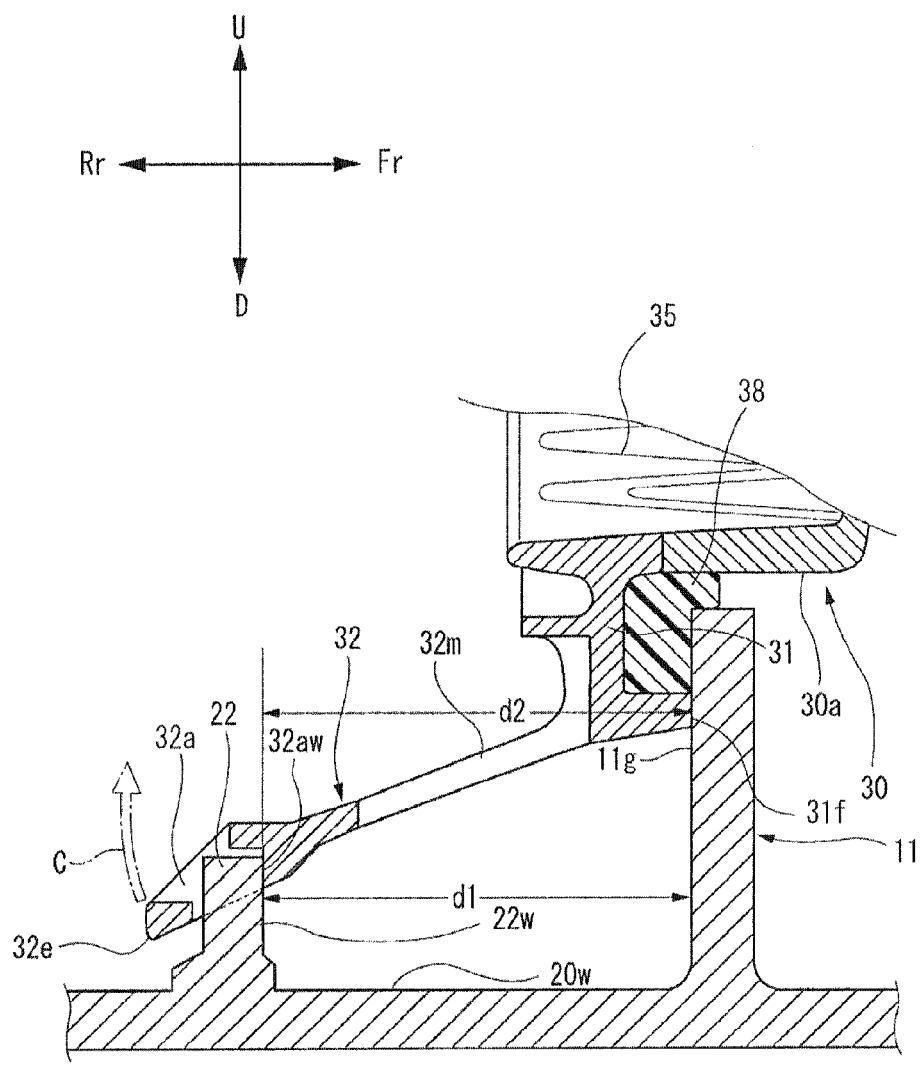
FIG. 8 is a cross-sectional view taken along line X-X of FIG. 6.

As shown in FIG. 8, elastically deformable seal members 38 are sandwiched between the rear surface 11g of the first rib 11 and the flanges 31. The seal members 38 thus placed are elastically deformed and held in intimate contact with the rear surface 11g and the flanges 31 for an increased sealing capability.

Figure 9:
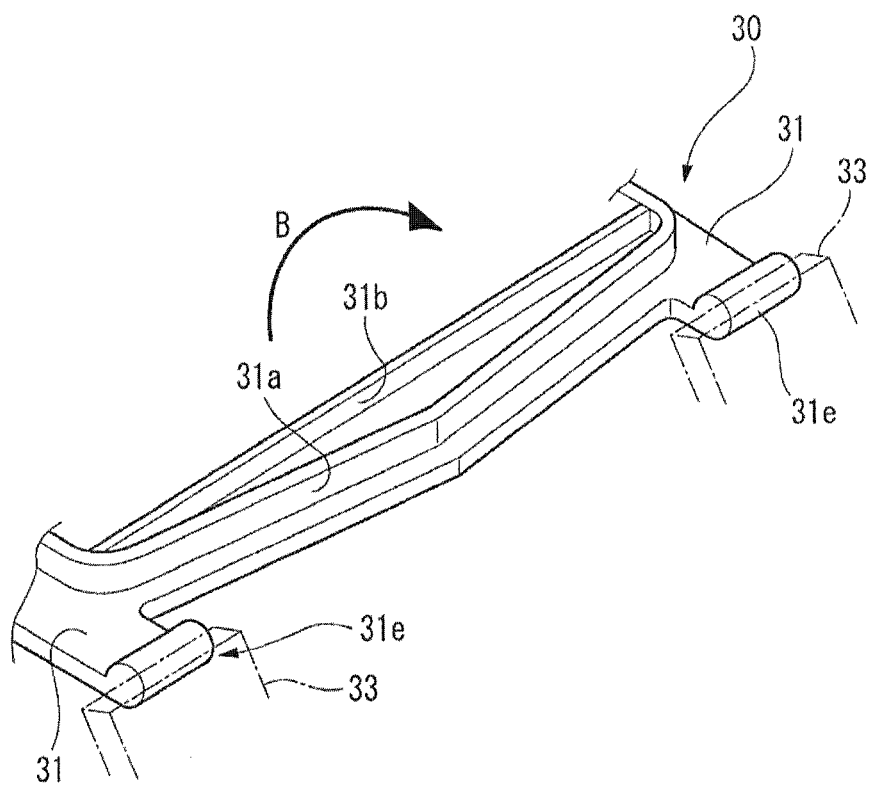
FIG. 9 is a fragmentary perspective view showing a lower flange of the filter element.

As shown in FIG. 9, the lower flange 31 of the filter element 30 has round end surfaces 31e in positions overlapping the third ribs 33.

The upper opening 7a defined in the upper portion of the main frame 7 is closed by the upper lid 8. The upper lid 8 has a fourth rib 44 projecting in overlapping relation to the filter element 30 as viewed along the direction of the intake air flow F.

A process of installing the filter element 30 will be described below.

With the upper lid 8 being detached (see FIG. 4), the filter element 30 is inserted into the main frame 7 through the upper opening 7a. The filter element 30 is placed such that the round end surfaces 31e of the lower flange 31 thereof are put inwardly of the second ribs 22, i.e., between the second ribs 22 and the first rib 11. Then, the filter element 30 is pushed in so as to be turned about the round end surfaces 31e forwardly along the direction indicated by the arrow B in FIG. 9, and the engaging holes 32a of the engaging members 32 are brought into fitting engagement with the second ribs 22. The filter element 30 is now held in the main frame 7. Thereafter, the upper opening 7a is closed by the upper lid 8 placed thereover. The fourth rib 44 of the upper lid 8 is positioned behind the upper flange 31 of the filter element 30.

For removing the filter element 30, the upper lid 8 is detached, and then the worker puts its hand into the main frame 7 through the upper opening 7a and lifts respective distal ends 32e of the engaging members 32 away from the inner wall surface 20w along the direction indicated by the arrow C in FIG. 8, disengaging the distal ends 32e from the second ribs 22. Even when all the engaging members 32 are dislodged off the second ribs 22, the filter element 30 can be removed without falling off because the round end surfaces 31e are positionally limited as they are positioned between the second ribs 22 and the first rib 11.

According to the present embodiment, the inner wall surface 20w of the air cleaner 20 has the first rib 11 projecting inwardly into the space in the main frame 7 along the transverse cross-sectional plane across the motorcycle, and the second ribs 22 projecting inwardly into the main frame 7 from a portion of the inner wall surface 20w upstream or downstream of the first rib 11. The filter element 30 has the engaging members 32 extending substantially along the inner wall surface 20w and engageable with the second ribs 22. The filter element 30 is supported by engagement between the first rib 11 and the second ribs 22. Therefore, there is no need for fastener members such as bolts or the like for holding the filter element 30 in position. The filter element 30 can thus be installed and removed with ease, resulting in an increase in the serviceability of the air cleaner 20.

According to the present embodiment, the third ribs 33 project inwardly into the space in the main frame 7 between the first rib 11 and the second ribs 22 in overlapping relation to the filter element 30 as viewed along the direction of the intake air flow F. The filter element 30 can also be supported by the third ribs 33.

According to the present embodiment, the lower flange 31 of the filter element 30 has the round end surfaces 31e in the positions overlapping the third ribs 33. For installing or removing the filter element 30, the round end surfaces 31e of the filter element 30 are provisionally held in overlapping relation to the third ribs 33, and the filter element 30 is turned about the round end surfaces 31e until it is installed or removed. The filter element 30 is easily positioned when it is installed, and is better handled, e.g., is prevented from falling off when it is removed.

According to the present embodiment, the main frame 7 has the upper opening 7a defined in the upper portion thereof and closed by the upper lid 8. The upper lid 8 has the fourth rib 44 projecting in overlapping relation to the filter element 30 as viewed along the direction of the intake air flow F. A portion of the filter element 30 can be positionally limited and pressed by the fourth rib 44.

According to the present embodiment, as viewed in a sectional side elevation of the main frame 7, the first rib 11 is disposed upstream of the upper opening 7a with respect to the intake air flow F, whereas the second ribs 22 are disposed downstream of the first rib 11 with respect to the intake air flow F and are located in positions within the projected range Z of the upper opening 7a as viewed substantially from above the main frame 7. Since the upper opening 7a can be used as a working space, the filter element 30 can be installed and removed easily and efficiently.

According to the present embodiment, the main frame 7 has the water drain hole 50 defined therein upstream of the filter element 30 with respect to the intake air flow F and positioned downwardly of the lower end UL (see FIG. 5) of the element filter 35. Therefore, the element filter 35 is prevented from becoming wet with water.

According to the present embodiment, as viewed in the sectional side elevation of the main frame 7, the lower rib wall section 11D of the first rib 11 and the lower wall surface 20wd jointly define therebetween the downwardly recessed space 12 disposed upstream of the first rib 11 with respect to the intake air flow F. Dust in the dirty side 21d can be held in the downwardly recessed space 12. Therefore, the main frame 7 can easily be cleaned when the filter element 30 is installed and removed.

According to the present embodiment, the main frame 7 is produced as an integral structural component by casting. Therefore, the first rib 11, the second ribs 22, and the third ribs 33 that project inwardly into the space in the main frame 7 are produced in a single casting process. Thus, the main frame 7 can be produced highly efficiently.

Although the embodiment of the present invention has been described above, the present invention is not limited to the illustrated embodiment, but appropriate changes and modifications may be made thereto. For example, the second ribs 22 are disposed downstream of the first rib 11 with respect to the intake air flow F in the illustrated embodiment. According to the present invention, however, the second ribs 22 may be disposed upstream of the first rib 11 with respect to the intake air flow F.

The shapes of the first rib 11, the second ribs 22, the third ribs 33, and the fourth rib 44, and the shape of the engaging members 32 are not limited to those according to the above embodiment, but may be changed appropriately. The numbers of the second ribs 22 and the engaging members 32 are not limited two pairs of left and right ribs or members each, but may be changed appropriately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a saddle vehicle, comprising:
a hollow main frame extending rearwardly from a head pipe; and
an air cleaner including a filter element disposed in the hollow main frame, said air cleaner being divided into a dirty side and a clean side by the filter element, the hollow main frame having a front opening defined in a front portion thereof for introducing intake air,
wherein the hollow main frame includes an inner wall surface having a first rib extending peripherally and projecting inwardly into a space in the hollow main frame, and a second rib disposed upstream or downstream of the first rib with respect to an intake air flow and projecting inwardly into the space in the hollow main frame,
wherein the filter element has an engaging member extending substantially along the inner wall surface and engageable with the second rib,
wherein the first rib peripherally surrounds the filter element to provide a division wall with the second rib engaging the filter element to support the filter element, and
wherein, as viewed in a sectional side elevation of the hollow main frame, a lower rib wall section of the first rib and a lower wall surface of the inner wall surface which is slanted downwardly toward a projection proximal portion of the lower rib wall section jointly define therebetween a downwardly recessed space disposed upstream of the lower rib wall section of the first rib with respect to the intake air flow.

2. The frame structure for a saddle vehicle, according to claim 1, wherein a third rib projects inwardly into the space in the hollow main frame and is disposed between the first rib and the second rib in an overlapping relationship to the filter element as viewed along the direction of the intake air flow.

3. The frame structure for a saddle vehicle, according to claim 2, wherein the filter element has a flange in a position overlapping the third rib as viewed along the direction of the intake air flow, the flange having a round end surface on a distal end thereof.

4. The frame structure for a saddle vehicle, according to claim 1, wherein the hollow main frame has an upper opening defined in an upper portion thereof;
the upper opening is closed by an upper lid; and
the upper lid has a fourth rib disposed on an inner surface thereof and projecting in an overlapping relationship to the filter element as viewed along the direction of the intake air flow.

5. The frame structure for a saddle vehicle, according to claim 2, wherein the hollow main frame has an upper opening defined in an upper portion thereof;
the upper opening is closed by an upper lid; and
the upper lid has a fourth rib disposed on an inner surface thereof and projecting in an overlapping relationship to the filter element as viewed along the direction of the intake air flow.

6. The frame structure for a saddle vehicle, according to claim 3, wherein the hollow main frame has an upper opening defined in an upper portion thereof;
the upper opening is closed by an upper lid; and
the upper lid has a fourth rib disposed on an inner surface thereof and projecting in an overlapping relationship to the filter element as viewed along the direction of the intake air flow.

7. The frame structure for a saddle vehicle, according to claim 4, wherein, as viewed in a sectional side elevation of the hollow main frame, the second rib is disposed downstream of the first rib with respect to the intake air flow and is located within a vertically projected range of the upper opening.

8. The frame structure for a saddle vehicle, according to claim 1, wherein the hollow main frame has a water drain hole defined therein upstream of the filter element with respect to the intake air flow and positioned downwardly of at least an element filter.

9. The frame structure for a saddle vehicle, according to claim 2, wherein the hollow main frame has a water drain hole defined therein upstream of the filter element with respect to the intake air flow and positioned downwardly of at least an element filter.

10. The frame structure for a saddle vehicle, according to claim 1, wherein the hollow main frame is composed of an integral structural component produced by casting.

11. The frame structure for a saddle vehicle, according to claim 2, wherein the hollow main frame is composed of an integral structural component produced by casting.

12. A frame structure for a saddle vehicle, comprising:
a hollow main frame extending rearwardly from a head pipe;
a front opening defined in a front portion of the hollow main frame for introducing intake air into a space formed in the hollow main frame;
an inner wall surface formed within the hollow main frame, said inner wall surface having a first rib extending peripherally and projecting inwardly into the space in the hollow main frame, and a second rib disposed upstream or downstream of the first rib with respect to an intake air flow and projecting inwardly into the space in the hollow main frame;
an air cleaner including a filter element disposed within the space formed in the hollow main frame, said air cleaner being divided into a dirty side and a clean side by the filter element;
an engaging member formed on the filter element, said engaging member extending substantially along the inner wall surface and engageable with the second rib; and
the first rib peripherally surrounds the filter element to provide a division wall with the second rib engaging the filter element to support the filter element,
wherein, as viewed in a sectional side elevation of the hollow main frame, a lower rib wall section of the first rib and a lower wall surface of the inner wall surface which is slanted downwardly toward a projection proximal portion of the lower rib wall section jointly define therebetween a downwardly recessed space disposed upstream of the lower rib wall section of the first rib with respect to the intake air flow.

13. The frame structure for a saddle vehicle, according to claim 12, wherein a third rib projects inwardly into the space in the hollow main frame and is disposed between the first rib and the second rib in an overlapping relationship to the filter element as viewed along the direction of the intake air flow.

14. The frame structure for a saddle vehicle, according to claim 13, wherein the filter element has a flange in a position overlapping the third rib as viewed along the direction of the intake air flow, the flange having a round end surface on a distal end thereof.

15. The frame structure for a saddle vehicle, according to claim 12, wherein the hollow main frame has an upper opening defined in an upper portion thereof;
the upper opening is closed by an upper lid; and
the upper lid has a fourth rib disposed on an inner surface thereof and projecting in an overlapping relationship to the filter element as viewed along the direction of the intake air flow.

16. The frame structure for a saddle vehicle, according to claim 15, wherein, as viewed in a sectional side elevation of the hollow main frame, the second rib is disposed downstream of the first rib with respect to the intake air flow and is located within a vertically projected range of the upper opening.

17. The frame structure for a saddle vehicle, according to claim 12, wherein the hollow main frame has a water drain hole defined therein upstream of the filter element with respect to the intake air flow and positioned downwardly of at least an element filter.

* * * * *

UNITED STATES PATENT AND TRADEMARK OFFICE
CERTIFICATE OF CORRECTION

PATENT NO. : 9,296,445 B2
APPLICATION NO. : 14/659331
DATED : March 29, 2016
INVENTOR(S) : Masahiro Kontani It is certified that error appears in the above-identified patent and that said Letters Patent is hereby corrected as shown below:

ON THE TITLE PAGE:

At item (73), Assignee, change "HONDA MOTRO CO., LTD., Tokyo (JP)" to

--HONDA MOTOR CO., LTD., Tokyo (JP)--.

Signed and Sealed this
Second Day of August, 2016

Michelle K. Lee
*Director of the United States Patent and Trademark Office*